July 29, 1941.　　　　J. GARST　　　　2,250,948
HARVESTER
Filed Sept. 18, 1939　　　2 Sheets-Sheet 1

Inventor
Jonathan Garst

By Caswell + Lagaard
Attorneys

July 29, 1941.　　　J. GARST　　　2,250,948
HARVESTER
Filed Sept. 18, 1939　　　2 Sheets-Sheet 2
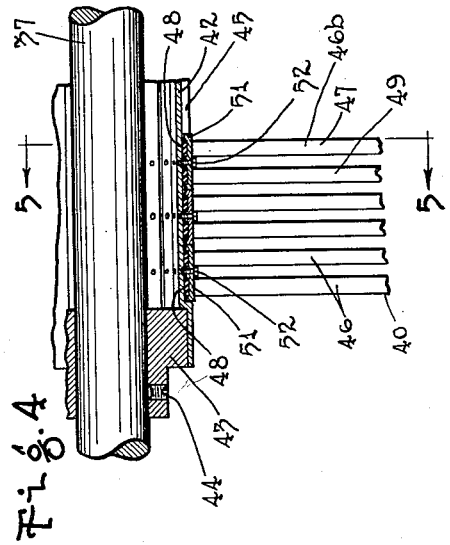
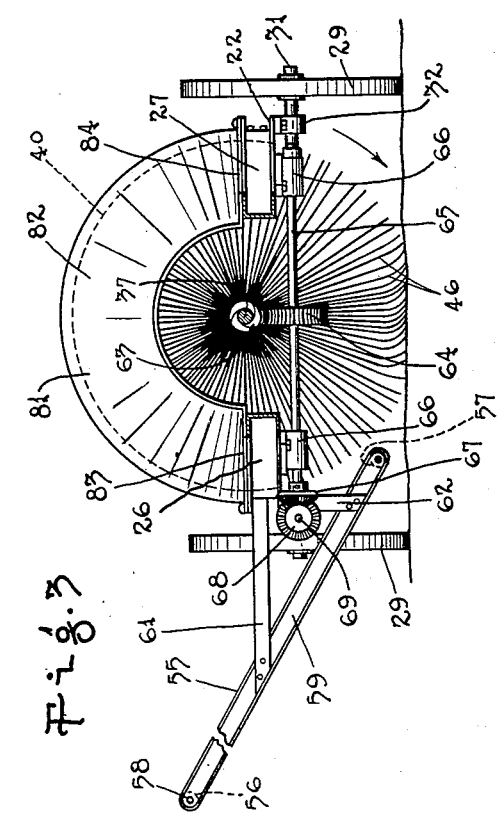
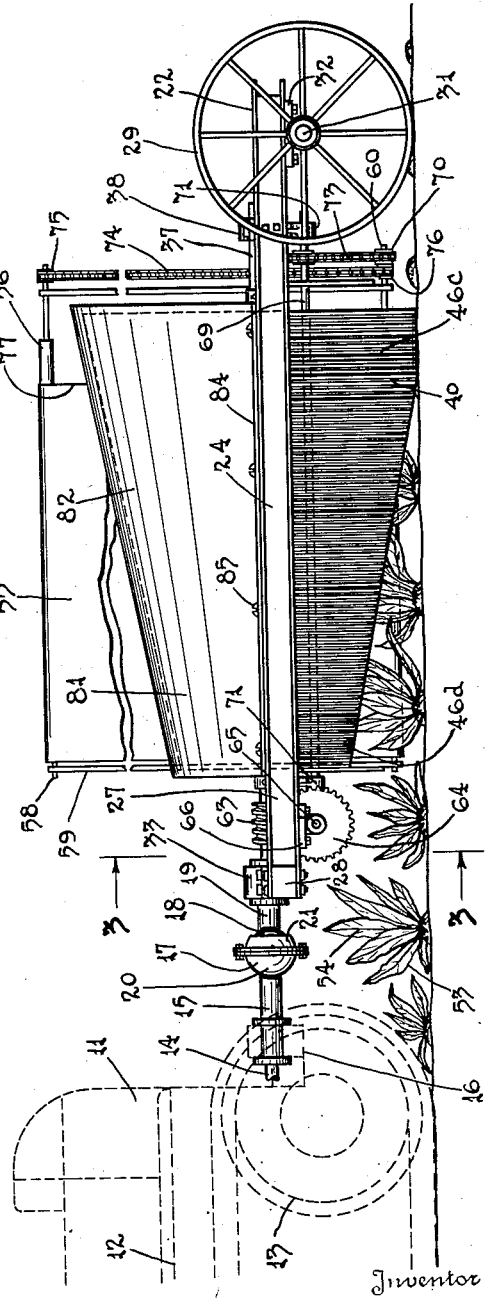
Inventor
Jonathan Garst
By Caswell & Lagaard
Attorneys Patented July 29, 1941

2,250,948

UNITED STATES PATENT OFFICE 2,250,948

HARVESTER

Jonathan Garst, Palo Alto, Calif.

Application September 18, 1939, Serial No. 295,362

8 Claims. (Cl. 56—156)

My invention relates to harvesters and has for an object to provide a harvester by means of which the tops or appendages of beets and other vegetation may be completely removed without injury to the roots or body portions thereof.

Another object of the invention resides in providing a harvester capable of completely removing the tops or appendages of the vegetation without injury to the roots or body portions regardless of the elevation of the roots or tops with reference to the ground.

An object of the invention resides in providing a harvester in which the tops or appendages are removed by flicking off the end portions of the same.

A still further object of the invention resides in providing a harvester in which the flicking off of the ends of the tops is progressively carried out from the outer ends to the roots of the plants.

Another object of the invention resides in providing a harvester having a revoluble topper including a plurality of thin flexible, normally limp whip lashes adapted to be held in radial directions through centrifugal force and to flick off the ends of the tops of the vegetation when coming into engagement with the same.

Another object of the invention resides in providing a harvester in which seeds may be harvested through the use of normally limp whip lashes.

A feature of the invention resides in arranging said lashes so that the tips thereof become situated at various elevations above the ground.

Another object of the invention resides in providing a conveyor for carrying away the severed portions of the tops.

A still further object of the invention resides in providing a construction in which the earth removed by the machine is prevented from being carried along with the tops.

An object of the invention resides in arranging the axis of said revoluble topper when used for harvesting the tops of plants arranged in rows so that the same extends in the direction of the row of plants whereby the whip lashes may simultaneously engage the tops of several plants.

Another object of the invention resides in arranging the axis of said revoluble topper substantially horizontal and in constructing the whip lashes of suitable lengths so that the tips thereof form a truncated cone extending along the row of plants and progressively engaging the tops of the plants at various elevations above the ground.

A feature of the invention resides in arranging the whip lashes so that the base of the cone is at the rear of the machine.

An object of the invention resides in constructing the whip lashes of extremely flexible and limp material such as leather or fabric impregnated with rubber which will be capable of flexing when engaging the roots of the plants and passing over the same without removing any portion of the roots or injuring the same.

Other objects of the invention reside in the novel combination and arrangement of parts and in the details of construction hereinafter illustrated and/or described.

In the drawings:

Fig. 2 is a side elevational view of the structure shown in Fig. 1.

Fig. 3 is a cross sectional view of the harvester taken on line 3—3 of Fig. 2.

Fig. 4 is a fragmentary sectional detail view of a portion of the revoluble topper showing the method of attaching the whip lashes thereto.

Figure 1:
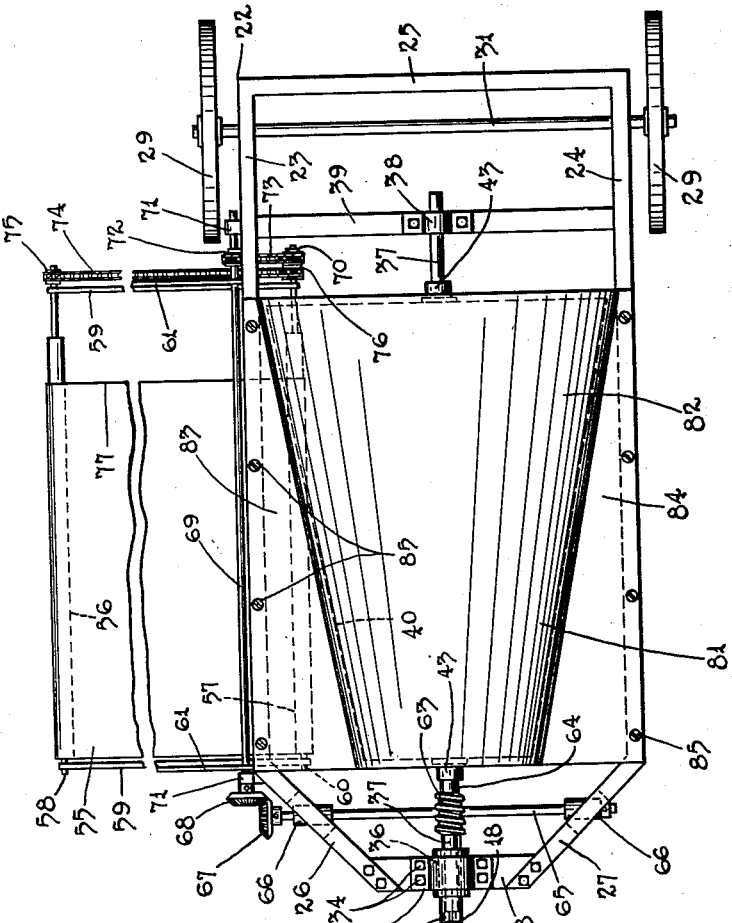
Fig. 1 is a plan view of a harvester illustrating an embodiment of my invention.

My invention, as illustrated, is designed to be drawn or propelled by a tractor which I have indicated in its entirety by the reference numeral 11. This tractor comprises a chassis 12 including a supporting wheel 13 and also includes an engine and transmission, not shown. The construction of the tractor not forming any feature of the invention has not been illustrated and will not be described. The transmission of the tractor 11 includes a shaft 14 which is selectively driven from the engine, and which is rotatably mounted in a tubular housing 15 attached to a portion of the framework 16 of the chassis 12 of said tractor. This housing is connected by means of a universal joint housing 17 with another tubular housing 19. The universal joint housing 17 comprises a spherical end bell 20 which forms a socket for a corresponding end bell 18 mounted on the tubular housing 19. A spherical cap 21, bolted to the end bell 20, holds the end bell 18 flexibly connected to the housing 15.

The invention proper consists of a frame, which I have indicated in its entirety by the reference numeral 22. This frame consists of two longitudinal frame members 23 and 24 bent intermediate their ends to provide two forwardly extending converging frame members 26 and 27. The frame members 23 and 24 are connected at the rear through a cross frame member 25. The converging frame members 26 and 27 are connected together by means of a forward cross frame member 28.

The frame 22 is supported at its rearward end in proximity to the cross frame member 25 by means of two supporting wheels 29 attached to an axle 31. Axle 31 is journalled in bearings 32 which are attached to the underside of the frame members 23 and 24. The forward end of the frame 22 is supported through the tubular housing 19 and the universal joint housing connected thereto. The tubular housing 19 extends over the cross frame member 28 and is rigidly secured thereto by means of a clamp 33 bolted to said frame through bolts 34. By means of this construction the harvester may be drawn by the tractor 11, and will trail the tractor as the tractor travels over the ground.

Mounted in the tubular housing 19 is a bearing 36 which rotatably supports a shaft 37. Shaft 37 is longitudinally situated with reference to the frame 22 and is further journalled at its rearward end in a bearing 38 attached to another cross frame member 39 secured to the longitudinal frame members 23 and 24. Shaft 37 is connected by means of a universal joint 41 to the shaft 14, said universal joint being disposed within the universal joint housing 17.

Figure 5:
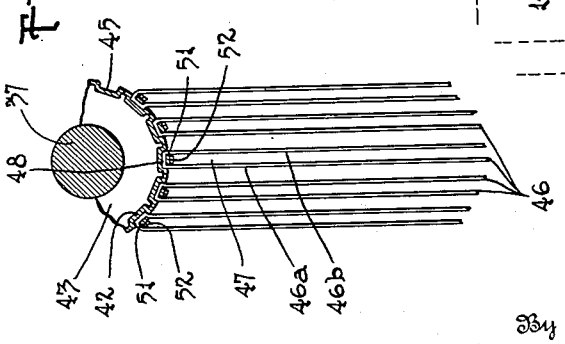
Fig. 5 is a cross sectional view taken on line 5—5 of Fig. 4.

Mounted on the shaft 37 is a topper 40 which is constructed as follows: Encircling the shaft 37 is a drum 42 which is carried by hubs 43 mounted on said shaft and held in position thereon through set screws 44. The drum 42 is provided with a plurality of longitudinally extending grooves 45 therein which extend throughout the length of the said drum. Attached to the drum 42 are a plurality of whip lashes 46 which are constructed of leather or a fabric impregnated with rubber or some similar material such as used for belting and like purposes. These whip lashes are arranged in pairs, each constructed from a single strip of material, one such pair being designated at 47 in Fig. 5. This pair comprises two lashes 46a and 46b which are connected together through an intermediate portion 48. The said pair of lashes and the adjoining pair, designated by the reference numeral 49 in Fig. 4, are held together in the following manner: Extending across the connecting portions 48 of these pairs of lashes is a clamp bar 51 which is grooved to receive these connecting portions. A bolt 52, threaded into the drum 42, clamps the said bar in position. The grooves 45 are of such width as to receive the clamp bars 51 and the portions of the lashes 46 adjacent the connecting portions 48. In this manner the lashes are fixedly connected to the drum in a manner so that the same may readily flex. All of the lashes are correspondingly attached to the drum 42.

When the shaft 37 is driven through the shaft 14, centrifugal force causes all of the lashes to project radially outwardly from the drum in the manner shown in Fig. 3. It will be noted in Fig. 2 that the lashes at the rear end of the machine, designated by the reference numeral 46c are of sufficient length to reach the ground when shaft 37 rotates, while the lashes forwardly thereof are progressively of lesser length so that the ends of the lashes designated at 46d at the forward end of the machine are considerably above the ground at all times. The lashes are preferably arranged so that the tips thereof, when in operative position, form a truncated cone whose base is at the rear of the machine.

When the machine is drawn over a row of plants such as beets or the like, such as designated at 53 in Fig. 2, the lashes when reaching their lowermost positions travel through the tops 54 of the plants. It will be noted that the forward lashes 46d being shorter engage the extreme outermost ends of the tops, while the intermediate lashes engage the tops at elevations closer to the ground. It will further be noticed that the lashes 46c engage the roots of the plants and also follow along the ground. The action of the lashes is to flick off small particles of leaves and to throw the same in a direction tangent to the cone formed by the lashes and at the elevation at which the leaves are engaged by the lashes. Thus, as the machine travels the lashes progressively flick off successive particles of the leaves until all of the tops have been removed. The various lashes being normally limp and readily flexible pass over the roots of the plants and the ground when the said lashes reach the plants whose tops have been previously removed. In this manner no portion of the roots is removed by the lashes. I have found that with whip lashes constructed of flexible rubber about $\frac{1}{8}'' \times \frac{3}{4}''$ and of lengths varying from 20'' to 27'' from the axis of the drum to the ends of the lashes excellent results were procured at peripheral velocities of from 100 to 200 lineal feet per minute.

For the purpose of enclosing the upper portion of topper 40 a guard 81 is employed. This guard comprises an arcuate portion 82 conforming to the form of the ends of the lashes 46 when in operative position and two flanges 83 and 84 projecting outwardly therefrom. These flanges overlie the upper surfaces of the frame members 23 and 24 and are secured thereto by means of screws 85.

For the purpose of collecting the leaf fragments removed by the various lashes of my invention I employ an endless conveyor belt indicated by the reference numeral 55 in Fig. 3. This conveyor belt travels over two rollers 56 and 57 which are mounted on shafts 58 and 60 journalled in suitable bearings formed in two longitudinal frame members 59. Frame members 59 are attached to the frame member 23 of frame 22 by means of braces 61 and 62.

Conveyor belt 55 is driven in the following manner: Attached to the shaft 37 in proximity to the cross frame member 28 is a worm 63. This worm meshes with a worm wheel 64, Fig. 3, mounted on a transverse shaft 65. Shaft 65 is journalled in bearings 66 attached to the frame members 26 and 27. Shaft 65 has mounted on one end thereof a bevel gear 67 which meshes with another bevel gear 68 mounted on another shaft 69. Shaft 69 extends longitudinally and is journalled in bearings 71 attached to the frame member 26 and to the frame member 23. Shaft 69 at its other end carries a sprocket wheel 72. A chain 73 passes over this sprocket wheel 72 and over another sprocket wheel 73 mounted on the shaft 60 of roller 57. Shaft 58 is driven from the shaft 60 by means of another chain 74 which passes over two sprocket wheels 75 and 76 carried by the shafts 58 and 60 respectively. It will be noted that the endless conveyor belt 55 is of less width than the length of the topper 40, the edge 77 thereof terminating at a point forwardly of the lashes 46c. By means of this construction the material removed by the lashes 46c is discharged directly upon the ground and not on the belt 55, while the material removed by the lashes opposite said belt is thrown upon the belt and elevated. If desired, a wagon or any receptacle may be used at the discharge end of the belt 55 and the tops removed, and carried by the belt and deposited in said wagon or receptacle. By arranging the edge 77 of the belt 55, as illustrated, the clean tops or leaf fragments are separated from the leaf fragments mingled with earth.

Although my invention is particularly adaptable for removing the tops from beets and other similar plants, it can readily be comprehended that the harvester may be used for removing the vegetation above the ground from various types of plants. One such other plant from which the leaves might be removed would be alfalfa.

If the speed of the revoluble member is somewhat reduced the seeds of the plants would be removed instead of the entire tops of the plants so that the invention may also be used for harvesting seeds.

The advantages of my invention are manifest. An extremely simple and practical construction is provided by means of which the tops or appendages of plants may be removed without injury to the roots or body portions thereof. With my invention the tops may be removed while the roots are still in the ground and the leaves collected and used for feed. Due to the varying lengths of the lashes, the leaves are removed in fragments so that it becomes unnecessary to run the tops through a shredder before storage of the leaves for feed. Due to the fact that the lashes are extremely flexible and limp, injury to the roots or body portions of the plants is prevented. My invention operates equally as well whether the roots of the plants are in the ground or project above the ground. After the tops have been removed by my invention, the roots such as beets may be plowed up and collected and the crowns removed without difficulty by the usual machinery now employed for the purpose. If desired, the crowns may be removed while the roots are still in the ground and when finally plowed up the roots are ready for shipment. With my invention there are no complicated or intricate parts to get out of order and the device will operate in the desired manner for an extended period of time.

Changes in the specific form of my invention, as herein disclosed, may be made within the scope of what is claimed without departing from the spirit of my invention.

Having described my invention, what I claim as new and desire to protect by Letters Patent is:

1. A harvester comprising a wheel supported frame adapted to travel along a row of plants, a revoluble member carried by said frame and a plurality of thin flexible normally limp whip lashes formed of fabric impregnated with rubber and projecting outwardly therefrom, means for driving said revoluble member at a speed to hold said whip lashes in outwardly extending positions, means for supporting said frame at an elevation to cause the ends of the lashes to strike the plants and when engaging the appendages thereof flicking off the same and flexing upon contacting the body portions of the plants to prevent injury thereto.

2. A harvester comprising a wheel supported frame adapted to travel along a row of plants, a revoluble member carried by said frame and a plurality of thin flexible normally limp whip lashes constructed of leather and projecting outwardly therefrom, means for driving said revoluble member at a speed to hold said whip lashes in outwardly extending position, means for supporting said frame at an elevation to cause the ends of the lashes to strike the plants and when engaging the appendages thereof flicking off the same and flexing upon contacting the body portions of the plants to prevent injury thereto.

3. A harvester comprising a wheel supported frame adapted to travel along a row of plants, a revoluble member carried by said frame and having a surface of revolution concentric with its axis, the axis of said revoluble member extending substantially horizontally in the direction of the row of plants and a plurality of thin flexible normally limp whip lashes projecting outwardly from said surface and distributed about said surface, means for driving said revoluble member at a speed sufficient to hold said whip lashes in outwardly extending positions, said lashes being of such lengths that the distance from the axis to the tips of the lashes in any plane normal to said axis is substantially equal, and the distances between the axis and the tips of the lashes in various planes along the axis of the revoluble member increase progressively to cause the lashes to strike the plants and when engaging the appendages thereof progressively flicking off the same and flexing upon contacting the body portions of the plants to prevent injury thereto.

4. A harvester comprising a wheel supported frame adapted to travel along a row of plants, a revoluble member carried by said frame, the axis of said revoluble member extending in the direction of the row of plants, and a plurality of thin flexible normally limp whip lashes projecting outwardly from said revoluble member, means for driving said revoluble member at a speed sufficient to hold said whip lashes in outwardly extending positions, said whip lashes being of such lengths that the tips thereof form a surface of revolution and strike the plants, said lashes when engaging the appendages thereof flicking off the same and flexing when engaging the body portions of the plants to prevent injury thereto.

5. A harvester comprising a wheel supported frame adapted to travel along a row of plants, a revoluble member carried by said frame and having a surface of revolution concentric with its axis, the axis of said revoluble member extending substantially horizontally in the direction of the row of plants and a plurality of thin flexible normally limp whip lashes projecting outwardly from said surface and distributed about said surface, means for driving said revoluble member at a speed sufficient to hold said whip lashes in outwardly extending positions, said lashes being of such lengths that the tips thereof form a truncated cone and travel through the tops of the plants at progressively decreasing elevations, the base of the cone being disposed at the rear of the harvester, said lashes striking the plants and when engaging the appendages thereof progressively flicking off the same and flexing upon contacting the body portions of the plants to prevent injury thereto.

6. A harvester comprising a wheel supported frame adapted to travel along a row of plants, a revoluble member carried by said frame, a plurality of thin flexible normally limp whip lashes projecting outwardly therefrom and means for driving said revoluble member at a speed sufficient to hold said whip lashes in outwardly extending positions, said lashes being arranged to strike the plants and when engaging the appendages thereof flicking off the same and flexing upon contacting the body portions of the plants to prevent injury thereto.

7. A harvester comprising a wheel supported frame adapted to travel along a row of plants, a revoluble member carried by said frame, a plurality of thin flexible normally limp whip lashes projecting outwardly therefrom and means for driving said revoluble member at a speed sufficient to hold said whip lashes in outwardly extending positions, said frame being supported so that the tips of the lashes, when at their lowermost positions progressively increase in elevation above the ground in the direction of the row to strike the plants and when engaging the appendages thereof progressively flicking off the same from the tips thereof toward the roots, said lashes flexing upon contacting the body portions of the plants to prevent injury thereto.

8. A harvester comprising a wheel supported frame adapted to travel along a row of plants, a revoluble member carried by said frame, a plurality of thin flexible normally limp whip lashes projecting outwardly therefrom, means for driving said revoluble member at a speed sufficient to hold said whip lashes in outwardly extending positions, said lashes being arranged to strike the plants and when engaging the appendages thereof flicking off the same and flexing upon contacting the body portions of the plants to prevent injury thereto, said lashes throwing the removed tops away from the revoluble member, and a conveyor carried by said frame and having a receiving end disposed relative to said revoluble member to receive the removed tops and conveying the same laterally of the frame.

JONATHAN GARST.